United States Patent
Bronson

[15] 3,663,073
[45] May 16, 1972

[54] SEALED BEARING EARTH BORING BIT

[72] Inventor: Charles L. Bronson, Dallas, Tex.

[73] Assignee: Varel Manufacturing Company, Dallas, Tex.

[22] Filed: Apr. 16, 1970

[21] Appl. No.: 29,009

[52] U.S. Cl. ................................ 308/8.2, 277/83, 277/88
[51] Int. Cl. .......................................................... F16c 19/00
[58] Field of Search ............. 308/8.2, 36.1; 277/83, 88, 277/94, 95

[56] References Cited

UNITED STATES PATENTS

| | | | |
|---|---|---|---|
| 3,370,895 | 2/1968 | Cason | 277/88 |
| 3,397,928 | 8/1968 | Galle | 308/36.1 |
| 3,199,878 | 8/1965 | Cunningham et al. | 308/8.2 |
| 3,096,835 | 7/1963 | Neilson | 308/8.2 |
| 3,075,781 | 1/1963 | Atkinson et al. | 277/83 |

Primary Examiner—Martin P. Schwadron
Assistant Examiner—Clemens Schimikowski
Attorney—Arnold, White & Durkee, Tom Arnold, Bill Durkee, Jack C. Goldstein, , John F. Lynch, Louis T. Pirkey, Frank S. Vaden, III and Robert A. White

[57] ABSTRACT

A sealed bearing earth boring bit of the rolling cutter type in which a tapered first axially extending flange at the inner periphery of the annular seal is wedged in and bonded to a correspondingly tapered axially extending groove in the leg of the bit thereby positively fixedly securing the seal to the leg in a fluidly sealed relationship, and a method of making same. At the outer periphery of the seal, a second axially extending flange, which is resiliently urged against and in fluidly sealed engagement with the cutter, is provided with a plurality of radially extending cavities in fluid communication with the lubricant proximate the bearings to promote circulation of the lubricant, enchance cooling, and reduce friction and resulting wear of both the seal face and the mating surface of the cutter.

36 Claims, 6 Drawing Figures

PATENTED MAY 16 1972

Charles L. Bronson
INVENTOR

BY
Arnold, White & Durkee
ATTORNEYS

PATENTED MAY 16 1972

Charles L. Bronson
INVENTOR

BY
Arnold, White & Durkee
ATTORNEY

SEALED BEARING EARTH BORING BIT

BACKGROUND OF THE INVENTION

This invention relates generally to earth boring or penetrating apparatus, and more particularly to sealed bearing earth boring bits.

Conventional earth boring bits of the rolling cutter type typically have one or more downwardly extending legs provided with a downwardly and inwardly extending shaft on which a cone cutter is rotatably mounted. Usually, bearings, including an antifriction thrust-and-radial ball bearing and an antifriction radial roller bearing, are interposed between the cutter and the shaft to assume the loads imposed thereon during normal drilling operations.

During assembly, those bearings are filled with a lubricant which is easily retained prior to use of the bits in the field. However, during field use, the lubricant often becomes contaminated and may be washed away since the bits are ordinarily operated in an ambient of violently agitating flushing fluid which may be mud laden and/or polluted with cuttings. When that occurs, the bearings, of course, deteriorate rapidly and the effectiveness of the bit is decreased.

It has heretofore been proposed to supply lubricant to the bearings during drilling and to provide a seal between the cutter and the shaft or the leg for the dual purposes of retaining lubricant within the bearings and resisting the ingress of contaminants into the bearings. By way of example, U.S. Pat. No. 3,075,781, issued to Gerald O. Atkinson, et al. on Jan. 29, 1963, U.S. Pat No. 3,096,835, issued to William J. Neilson on July 9, 1963, and U.S. Pat. No. 3,199,878, issued to Robert A. Cunningham, et al. on Aug. 10, 1965, disclose bearing lubricant seals which purportedly maintain a seal between a relatively rotating cutter and shaft or leg even during the combination of relative axial, radial, and wobbling movement encountered during field use of the bit. To effect the sealing engagements between (i) the seal and the cutter and (ii) the seal and the shaft or leg, those prior art dished, frusto-conical, or Belleville spring-type annular seals primarily rely upon relatively resilient surfaces of the seal merely abutting relatively rigid, substantially planar surfaces of the cutter and the shaft or leg in response to that component of the axially directed spring force normal to the abutting surfaces.

However, it has been found, as a result of extensive field testing, that a seal ring which fits loosely on the shaft or leg does not work satisfactorily. Furthermore, the heat generated by the friction between the seal and the surfaces it slidingly engages or contacts is thought to be a major factor in producing unduly rapid wear and deterioration of the seal. Moreover, it has been discovered that merely providing a supply of lubricant to the bearings has shortcomings insofar as bearing lubrication is concerned since the lubricant is in a relatively static condition proximate the bearings.

SUMMARY OF THE INVENTION

Accordingly, one object of the present invention is the provision of a new and improved sealed bearing bit embracing all of the advantages of similarly employed sealed bearing bits and none of the aforementioned disadvantages thereof.

Another object of this invention is to provide a new and improved sealed bearing bit wherein the seal does not fit loosely on the shaft or leg but instead is satisfactorily fixedly secured thereto.

A further object of the present invention is the provision of a new and improved sealed bearing bit characterized by long seal life believed to be attributable to relatively cool operation.

Still another object of this invention is to provide a new and improved sealed bearing bit characterized by outstanding bearing lubrication as a result of agitating or churning the lubricant proximate the bearings.

Briefly, in accordance with one embodiment of the present invention, these and other objects are attained by providing an annular groove in and around a bit leg in which a portion of a resilient annular seal is wedged and bonded. Also, there may be provided in the seal a plurality of radial cavities in fluid communication with the space proximate the bit bearings.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings in which like reference characters designate identical or corresponding parts throughout the several views and wherein.

DESCRIPTION OF THE PREFERRED EMBODIMENT

Figure 1:
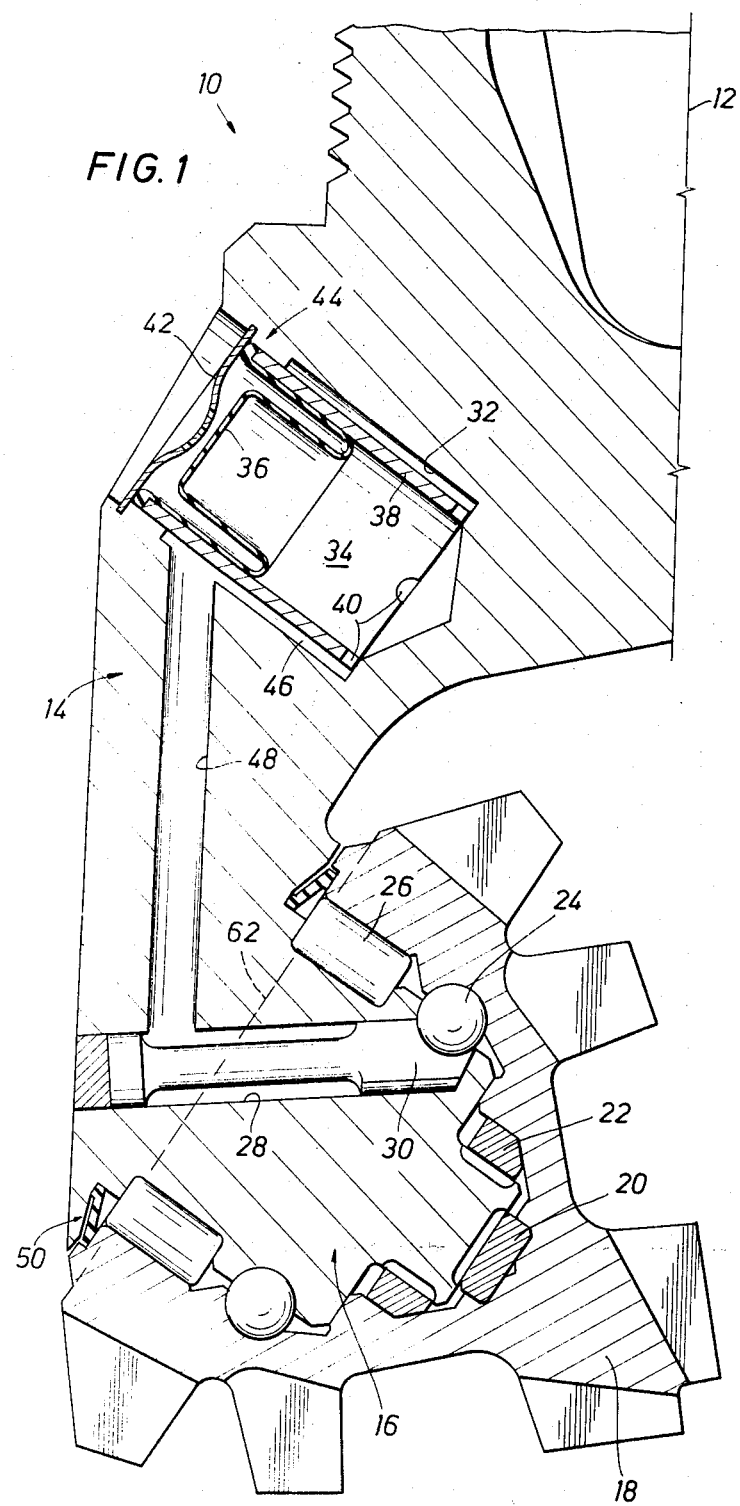
FIG. 1 is an elevation view, partly in section, of a portion of a sealed bearing earth boring bit of the rolling cutter type embodying the present invention.

Referring now to the drawings, and more particularly to FIG. 1 thereof, there is shown a portion of an earth boring bit 10 of the rolling cutter type having an axis 12 and a plurality of downwardly extending legs, one of such legs being illustrated at 14. Leg 14 is shown as terminating in an integral shaft 16 which extends downwardly and inwardly relative to axis 12.

A cone cutter 18 is rotatably mounted on shaft 16 by conventional means, such as friction thrust button bearing 20, friction radial bushing bearing 22, antifriction thrust-and-radial ball bearing 24, and antifriction radial roller bearing 26, the races of each bearing being provided by appropriate contours in the shaft and the cutter. Before cutter 18 is positioned on shaft 16, the rollers of roller bearing 26 are inserted in the appropriate annular recess in the shaft; and the cutter is thereafter positioned on the shaft to complete the formation of the roller bearing. The balls of ball bearing 24 are then inserted through a bore 28 extending from the exterior of leg 14 to a point in the ball bearing race. Thereafter, the balls are retained in their race by a cutaway or relieved pin 30 inserted in bore 28 and secured therein by convenient means, such as welding.

The upper portion of leg 14 is provided with a cylindrically shaped blind cavity 32 wherein there is formed a lubricant supply chamber 34. A relatively flexible diaphragm or boot 36 is suitably secured at its circumferential edge to one extremity of a relatively rigid tubular sleeve 38, the other extremity of which is provided with a plurality of radial ports, such as slots 40. Sleeve 38 is positioned in cavity 32 such that the slotted extremity of the sleeve abuts the closed end of the cavity, thereby forming the lubricant supply chamber.

A centrally perforated relatively rigid screen 42 is secured in position transversely across the opening of cavity 32 by any convenient means, such as a snap-fit into an appropriate annular groove in leg 14. Accordingly, screen 42 may maintain diaphragn 36 and sleeve 38 in position as well as provide structural protection for the diaphragm. Although diaphragm 36 is thus exposed to ambient pressures, lubricant supply chamber 34 is fluidly sealed from the ambient by a suitable annular sealing engagement of either (i) the screen with the diaphragm or (ii) the diaphragm, the sleeve, or both with a portion of the leg as at 44.

Since the outer diameter of sleeve 38 is less than the inner diameter of at least a portion of cavity 32, an annular passageway 46 is formed therebetween. Fluid communication between annular passageway 46 and lubricant supply chamber 34 is effected by slots 40, and a bore 48 intersects both annular passageway 46 and bore 28. Thus, lubricant supply chamber 34 is in fluid communication with the lubricated bearings via slots 40, annular passageway 46, bore 48, and the cutaway or relieved portions of pin 30 in bore 28, so that lubricant provided in the chamber may move freely to or from the bearings. An annular seal 50 surrounding shaft 16 is interposed between cutter 18 and leg 14 to retain lubricant within the bearings and to prevent the ingress of foreign materials into the bearings.

An important feature of the present invention resides in the hereinafter described details of annular seal 50 and the specific interrelationship thereof with the hereinafter described details of the other structure thus far described. As shown in greater detail in FIG. 2, a generally planar surface 52 on the base of cutter 18 and substantially perpendicular or normal to the axis thereof, is provided with a generally planar relieved surface 54, also substantially perpendicular to the axis of the cutter. Surfaces 52 and 54 are mutually intersected by a generally cylindrical surface 56 which is substantially coaxial with cutter 18; and the intersections of those surfaces may be blunted or rounded as shown at 58 and 60.

For purposes of discussion herein, the plane at which leg 14 becomes shaft 16 shall be defined by broken line 62; however, it should be understood that the fluid-tight seal hereinafter described may be effected between the cutter and either the leg or the shaft integral therewith. A generally planar surface 64 on leg 14, proximate the intersection or junction therewith of integral shaft 16 and substantially perpendicular or normal to the axis of the shaft, is intersected by a generally cylindrical surface 66 which is substantially coaxial with the shaft. The intersection of surfaces 64 and 66 may be blunted as shown at 68.

A generally planar surface 70 on leg 14, substantially perpendicular or normal to the axis of the shaft and axially relieved from surface 64, is intersected at an appropriate angle $\alpha$, such as 10°, by an angularly relatively relieved surface 72 generally in the shape of a truncated right cone substantially coaxial with the shaft.

A tapered annular axially relieved groove 74 is provided in surface 72 at the extremity thereof adjacent surface 66. Groove 74 includes a generally planar base surface 76 substantially perpendicular or normal to the axis of shaft 16 and two generally conical side surfaces 78 and 80, each inclined mutually inwardly in a direction away from roller bearing 26 at an appropriate angle $\beta$, such as 5°. Side surfaces 78 and 80 intersect surfaces 72 and 66, respectively, and the intersections of the side surfaces with the base surface may be rounded as shown at 82 and 84. Preferably, groove 74 is sufficiently deep to provide a clearance space s of axial depth d when seal 50 is snugly received or accommodated therein by the tight-fitting wedged engagement to be described.

As hereinbefore mentioned, annular seal 50 is a continuous ring surrounding leg 14 proximate intersection 62 therewith of shaft 16 and, as will be explained more fully hereinafter, is so constructed and arranged with respect to leg 14 and cutter 18 as to effect a fluid-tight seal therebetween. Seal 50 is generally in the form of a truncated cone and must be axially resilient to follow the movement of the cutter relative to the leg or shaft.

According to the preferred embodiment, the seal is a unitary composite structure including a central body 86 made of a suitably impervious and chemically inert material, such as buna-N synthetic acrylonitrile rubber, having secured thereto, preferably by bonding, suitable means for providing added strength and resiliency, such as a pair of Belleville springs 88 and 90 made of a suitably strong and resilient material, such as stainless steel. According to the presently preferred embodiment, the Belleville springs, each in the form of a frustum of a right cone, may or may not be identical.

Although in the preferred embodiment Belleville springs 88 and 90 are bonded to the exterior edges of central body 86, it should be apparent that the springs may be partially or entirely encased within the central body and may be secured thereto or therein other than by bonding. The springs may be provided with radial slots (not shown) and circular openings (also not shown) at the inner ends thereof, to facilitate variable axial displacement by enabling each finger between the slots to move axially, independently of the remainder of the spring. Alternatively, the springs may be radially corrugated to form alternate ridges and grooves around the circumference thereof, or some entirely different form of spring may be used. Moreover, although the preferred embodiment embraces two springs, the use of one spring, or more than two springs, is specifically contemplated by the present invention. It is also recognized that the springs may be eliminated altogether upon selection of a central body material having the requisite physical and chemical characteristics, including strength, resiliency, permeability, and chemical inertness or resistivity.

Figure 2:
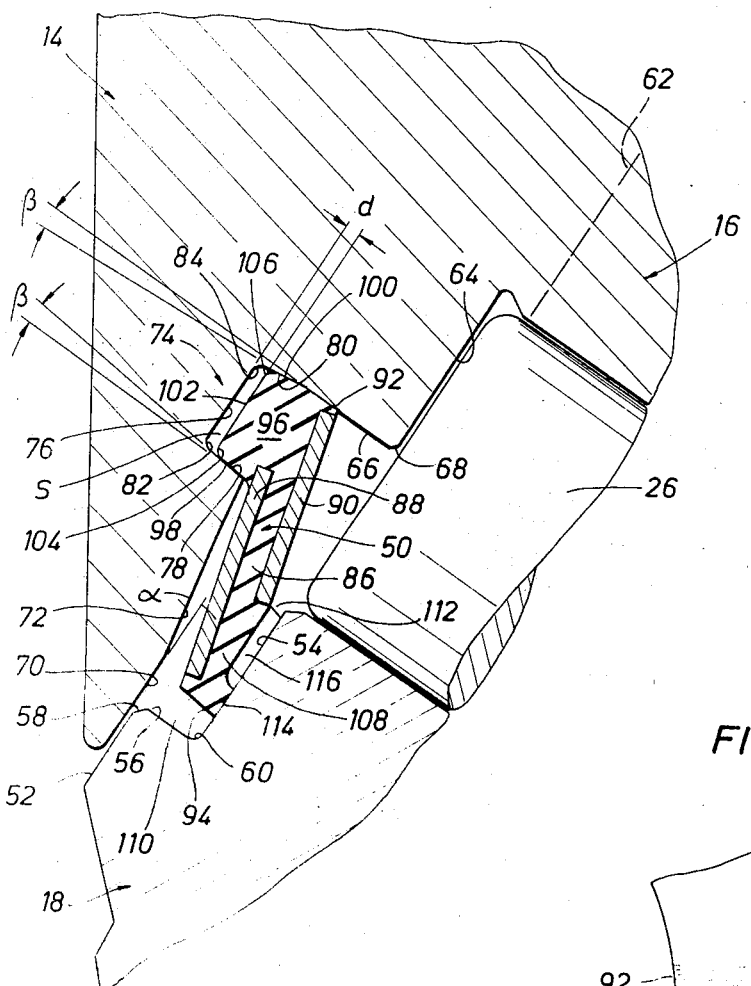
FIG. 2 is an enlarged detail elevation view, partly in section, of a portion of the apparatus shown in FIG. 1.

The inner periphery 92 of seal 50 may be of such diameter that there is essentially no clearance between the seal and surface 66 of leg 14. It is immaterial whether any such clearance exists or, on the other extreme, whether the inner periphery is sufficiently small that the seal may be force fitted on the leg since the seal is fixedly secured to the leg by improved means constituting an important feature of the present invention. Preferably, the diameter of inner periphery 92 of seal 50 is the same as that of surface 66 so that there is neither a clearance nor force fit therebetween. Thus, in the preferred embodiment, the engagement of seal 50 around surface 66, in and of itself, may be rotatable but nonslidable, thereby preventing the seal from floating radially relative to the leg; however, it is to be understood that the improved means of the present invention for fixedly securing the seal to the leg may be the primary means for positively ensuring against radial or sliding, as well as rotational, movement. The outer periphery 94 of seal 50 is preferably of such diameter as to provide radial clearance with surface 56 on cutter 18 even when outer periphery 94 is radially expanded in response to axial compression of the seal in situ as shown in FIG. 2.

Adjacent the inner periphery of seal 50, central body 86 is provided with an integral axially extending tapered flange 96 having generally conical side surfaces 98 and 100 intersecting a generally planar base surface 102. Each of the side surfaces of flange 96 are inclined mutually inwardly in a direction away from roller bearing 26 at angle $\beta$, and the intersection of the side surfaces with the base surface may be rounded as shown at 104 and 106. It should be apparent that either the groove or the flange may be tapered without the other being tapered; that the groove and the flange need not be tapered at the same angle to be mating; and that neither the groove nor the flange must be tapered. The radial width and axial depth of flange 96 should be such that the flange may be snugly received or accommodated in similarly shaped groove 74 in a wedged engagement therewith while preferably maintaining clearance space s of axial depth 1 therebetween. As will be more fully explained, flange 96 is bonded to, as well as wedged in, groove 74.

Figure 3:
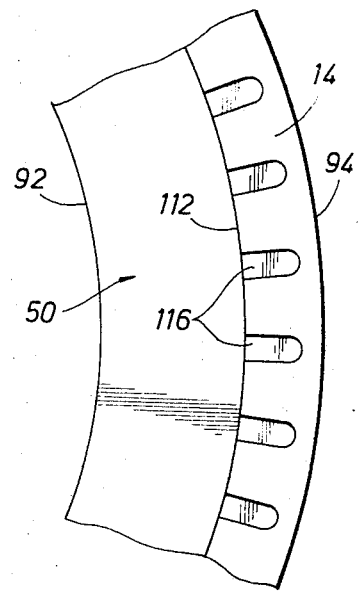
FIG. 3 is a plan view of a portion of the seal shown in FIGS. 1 and 2.

Adjacent the outer periphery of seal 50, central body 86 is provided with an integral axially extending flange 108 having generally conical side surfaces 110 and 112 intersecting a generally planar base surface 114. Preferably, the intersections of side surfaces 110 and 112 with base surface 114 are sharp and not rounded or blunted. Flange 108 may be provided with a plurality of slots or cavities 116 extending radially outwardly from side surface 112 and axially from base surface 114, as shown in FIGS. 2 and 3, such that the slots are in fluid communication with the bearing lubricant proximate roller bearing 26 even when base surface 114 is resiliently urged against, and in fluidly sealed engagement with, surface 54 of cutter 18 due to the axial compression of seal 50 in situ as shown in FIG. 2.

Figure 4:
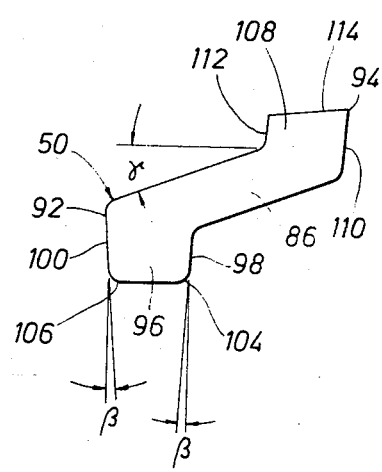
FIG. 4 is an elevation view of the profile of a section of the seal shown in FIGS. 1–3.

In FIG. 4, there is shown a sectional profile of seal 50 in its uncompressed, free shape.

Figure 5:
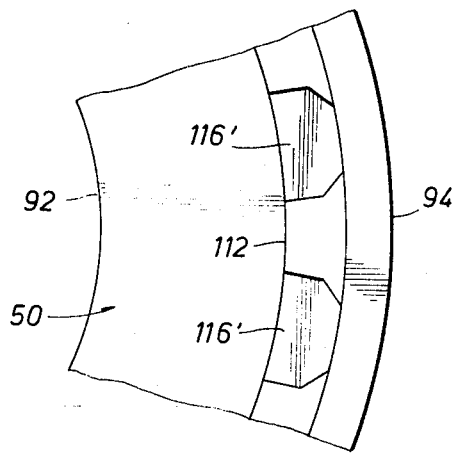
FIG. 5 is a plan view of a portion of another species of the seal.
Figure 6:
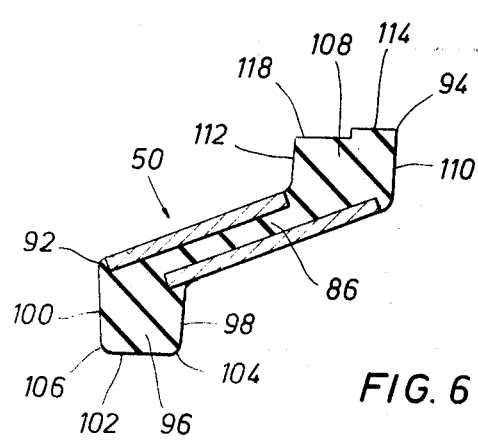
FIG. 6 is an elevation view of the profile of a section of the seal shown in FIG. 5.

In FIGS. 5 and 6 there are shown a plan view of a portion and a sectional profile, respectively, of another species of seal 50 in its uncompressed, free state, in which base surface 114 is provided with a generally planar annular relieved surface 118. Cavities 116' are shorter but wider than cavities 116, and the former are terminated by three obliquely intersecting planar surfaces instead of the single rounded surface of the latter.

Thus, it may be seen that seal 50 forms a fluid-tight seal between cutter 18 and leg 14 to retain lubricant within the bearings and to prevent the ingress of foreign materials into the bearings. With flange 96 of the seal wedged in, and bonded to, annular groove 74 of the leg, the seal is positively fixedly secured to the leg, thus providing improved means of preventing radial and rotational movement of the seal relative to the leg. Cavities 116 and 116' are believed to agitate or churn the lubricant proximate roller bearing 26 during field use and thus promote circulation of the lubricant around the bearings and maintain lower temperatures than otherwise experienced with such a seal having no such cavities. Further operation of the described embodiment is apparent from the foregoing description.

Another important feature of the present invention resides in the hereinafter described method of making the aforesaid structure. Initially, flat washers are conventionally blanked out in a die from appropriate sheet stock, such as 17-7 stainless steel. Each washer is then formed into a frustum of a right cone of suitable angle γ, such as 20°, and is thereafter solution heat treated at a suitable temperature, such as 1,750° F., and air cooled, preferably to room temperature. Each washer is subsequently cold treated at a suitable temperature for a suitable time, such as −100° F. for 8 hours; reheated to a suitable temperature for a suitable time, such as 950° F. for one hour; and finally air cooled to room temperature. The Belleville springs so fabricated have a Rockwell "C" hardness of approximately 46-50. Of course, differently made Belleville springs having generally the same characteristics as those produced according to the method just described may be used in the manufacture of the annular seal, but the springs produced by the disclosed method have been found to be highly satisfactory and particularly suitable for such use.

The surfaces of each Belleville spring are appropriately cleaned and roughened, by sand blasting, for example, to remove all scale, oxide, or other foreign matter that may have accumulated or been deposited thereon and to precondition the surfaces for bonding. Each spring is then coated with an appropriate primer, for example, of buna-N synthetic acrylonitrile rubber, such as by dipping into a liquid form of the primer and appropriately drying, thereby completing the preparation of the springs for sandwiching and bonding in a hot die.

A first Belleville spring is positioned in a lower concave portion or half of a die (not shown). Preferably, an annular or donut shaped piece of suitable material, such as buna-N synthetic acrylonitrile rubber, is then positioned in the concave portion of the die coaxially over the first Belleville spring. Next, a second Belleville spring is positioned coaxially over the annular piece of raw buna-N rubber. An upper convex portion or half of the die is lowered into mating engagement with the lower concave portion, and both heat and pressure are applied until the excess rubber is extruded out. After a suitable cure time, the die is opened; the seal, removed; and the excess rubber or flash, trimmed off. Likewise, although differently made annular seals having substantially the same shape and generally the same characteristics as those produced according to the method just described may be used in the manufacture of sealed bearing bits embodying the present apparatus invention, the seals produced by the disclosed method have been found to be highly satisfactory and particularly suitable for such use.

The surfaces of leg 14 in the area of tapered groove 74, particularly surfaces 66, 78, and 80, are appropriately precleaned and roughened, by sandblasting, for example, to remove all scale, oxide, or other foreign matter that may have accumulated or been deposited thereon and to precondition the leg surfaces for bonding. Surfaces 66, 67, 68, and 80 are then cleaned with methyl ethyl ketone and a paste brush. Next, leg surfaces 66, 78, and 80 in the groove area which the seal contacts are coated with an appropriate primer, for example, of buna-N rubber, such as by brushing on a liquid form of the primer and appropriately drying for approximately 2 hours at room temperature, for example.

Next, the surfaces of seal 50 in the area of tapered flange 96 which contact leg 14, particularly surfaces 98 and 100, are appropriately roughened as by buffing with sandpaper or emery cloth. Thereafter, the roughened surfaces of the seal are coated with a primer, of buna-N rubber, for example, by brushing on a liquid form of the primer and appropriately drying.

Lastly, seal 50 is assembled on leg 14, and tapered flange 96 is forced or wedged into tapered groove 74 by the application of pressure via a pressure ring (not shown). While the pressure is applied to the seal through the pressure ring to keep the tapered flange forced or wedged into the tapered groove, the assembly is heated to a suitable temperature for a suitable time, such as 275° F. for 2 hours, to effect a positive bond between the seal and the leg.

Although other methods may be used in the manufacture of sealed bearing bits embodying the present apparatus invention, the foregoing disclosed method has been found to be highly satisfactory and particularly suitable for such use.

Obviously, many modifications and variations of the present invention are possible in the light of the above teachings. For example, it should be readily apparent that the various surfaces on leg 14 and cutter 18 need not be either perpendicular to or coaxial with the axes of the shaft and the cutter; to the contrary, such relative positions are merely illustrative of one embodiment of apparatus embracing the present invention. Moreover, a variety of different materials may be used in the manufacture of one or more parts in the disclosed apparatus. Still further, although the preferred embodiment discusses a seal between the cutter and the leg, it should be apparent that the seal may be effected between the cutter and the shaft portion of the leg.

It is therefore to be understood that, within the scope of the appended claims, the invention may be practiced otherwise than as specifically described, without departing from the spirit and scope of the invention of which only the presently preferred embodiments have been disclosed.

What is claimed and desired to be secured by Letters Patent of the United States is:

1. In a sealed bearing earth boring bit comprising at least one leg having a first sealing surface and terminating in an integral shaft; a cutter rotatably mounted on said shaft and having a second sealing surface; at least one antifriction bearing disposed between said shaft and said cutter; means for supplying lubricant to said bearing; and seal means resiliently interposed between said leg and said cutter for effecting a fluid-tight seal therebetween at said first and second sealing surfaces, the improvement comprising:

a portion of said seal means being wedged into a groove provided in one of the sealing surfaces, said groove being defined at least in part by a pair of generally opposed walls between which said portion of said seal means is wedged.

2. The earth boring bit of claim 1 wherein said groove is tapered inwardly with increasing depth.

3. The earth boring bit of claim 2 wherein said portion of said seal means is tapered outwardly with increasing distance from the extremity thereof.

4. The earth boring bit of claim 3 wherein said groove and said portion of said seal means are tapered in a mutually mating fashion.

5. The earth boring bit of claim 4 wherein said portion of said seal means is sufficiently wide relative to the width of said groove to provide an end clearance therebetween when wedged therein.

6. The earth boring bit of claim 1 wherein said portion of said seal means is taped outwardly with increasing distance from the extremity thereof.

7. The earth boring bit of claim 1 wherein said seal means is provided with a plurality of cavities in fluid communication with the space proximate said bearing when said seal means is resiliently interposed between said leg and said cutter.

8. The earth boring bit of claim 4 wherein said seal means is provided with a plurality of cavities in fluid communication with the space proximate said bearing when said seal means is resiliently interposed between said leg and said cutter.

9. The earth boring bit of claim 5 wherein said seal means is provided with a plurality of cavities in fluid communication with the space proximate said bearing when said seal means is resiliently interposed between said leg and said cutter.

10. An earth boring bit, comprising:
at least one leg terminating in an integral shaft, said leg being provided with a grove therearound, said groove being defined at least in part by a pair of generally opposes walls;
a cutter rotatably mounted on said shaft;
at least one antifriction bearing disposed between said shaft and said cutter;
means for supplying lubricant to said bearing; and
seal means resiliently interposed between said leg and said cutter for effecting a fluid-tight seal therebetween, a portion of said seal means being wedged into said groove between said pair of generally opposed walls.

11. The earth boring bit of claim 10 wherein said groove in said leg is tapered inwardly with increasing depth.

12. The earth boring bit of claim 11 wherein said portion of said seal means is tapered outwardly with increasing distance from the extremity thereof.

13. The earth boring bit of claim 12 wherein said groove and said portion of said seal means are tapered in a mutually mating fashion.

14. The earth boring bit of claim 13 wherein said portion of said seal means is sufficiently wide relative to the width of said groove to provide an end clearance therebetween when wedged therein.

15. The earth boring bit of claim 10 wherein said portion of said seal means is tapered outwardly with increasing distance from the extremity thereof.

16. The earth boring bit of claim 10 wherein said seal means is provided with a plurality of cavities in fluid communication with the space proximate said bearing when said seal means is resiliently interposed between said leg and said cutter.

17. The earth boring bit of claim 13 wherein said seal means is provided with a plurality of cavities in fluid communication with the space proximate said bearing when said seal means is resiliently interposed between said leg and said cutter.

18. The earth boring bit of claim 14 wherein said seal means is provided with a plurality of cavities in fluid communication with the space proximate said bearing when said seal means is resiliently interposed between said leg and said cutter.

19. In a sealed bearing boring bit comprising at least one leg having a first sealing surface and terminating in an integral shaft; a cutter rotatably mounted on said shaft and having a second sealing surface; at least one antifriction bearing disposed between said shaft and said cutter; means for supplying lubricant to said hearing; and seal means resiliently interposed between said leg and said cutter for effecting a fluid-tight seal therebetween at said first and second sealing surfaces, the improvement comprising:
a portion of said seal means being wedged into a groove provided in one of the sealing surfaces, said groove being defined at least in part by a pair of generally opposed walls between which said portion of said seal means is wedged, and said portion of said seal means being bonded to at least one wall of said groove.

20. The earth boring bit of claim 19 wherein said groove is tapered inwardly with increasing depth.

21. The earth boring bit of claim 20 wherein said portion of said seal means is tapered outwardly with increasing distance from the extremity thereof.

22. The earth boring bit of claim 21 wherein said groove and said portion of said seal means are tapered in a mutually mating fashion.

23. The earth boring bit of claim 22 wherein said portion of said seal means is sufficiently wide relative to the width of said groove to provide an end clearance therebetween when wedged therein.

24. The earth boring bit of claim 19 wherein said portion of said seal means is tapered outwardly with increasing distance from the extremity thereof.

25. The earth boring bit of claim 19 wherein said seal means is provided with a plurality of cavities in fluid communication with the space proximate said bearing when said seal means is resiliently interposed between said leg and said cutter.

26. The earth boring bit of claim 22 wherein said seal means is provided with a plurality of cavities in fluid communication with the space proximate said bearing when said seal means is resiliently interposed between said leg and said cutter.

27. The earth boring bit of claim 23 wherein said seal means is provided with a plurality of cavities in fluid communication with the space proximate said bearing when said seal means is resiliently interposed between said leg and said cutter.

28. An earth boring bit, comprising:
at least one leg terminating in an integral shaft, said leg being provided with a groove therearound, said groove being defined at least in part by a pair of generally opposed walls;
a cutter rotatably mounted on said shaft;
at least one antifriction bearing disposed between said shaft and said cutter;
means for supplying lubricant to said bearing; and
seal means resiliently interposed between said leg and said cutter for effecting a fluid-tight seal therebetween, a portion of said seal means being wedged into said groove between said pair of generally opposed walls and bonded to said leg thereat.

29. The earth boring bit of claim 28 wherein said groove in said leg is tapered inwardly with increasing depth.

30. The earth boring bit of claim 29 wherein said portion of said seal means is tapered outwardly with increasing distance from the extremity thereof.

31. The earth boring bit of claim 30 wherein said groove and said portion of said seal means are tapered in a mutually mating fashion.

32. The earth boring bit of claim 31 wherein said portion of said seal means is sufficiently wide relative to the width of said groove to provide an end clearance therebetween when wedged therein.

33. The earth boring bit of claim 28 wherein said portion of said seal means is tapered outwardly with increasing distance from the extremity thereof.

34. The earth boring bit of claim 28 wherein said seal means is provided with a plurality of cavities in fluid communication with the space proximate said bearing when said seal means is resiliently interposed between said leg and said cutter.

35. The earth boring bit of claim 31 wherein said seal means is provided with a plurality of cavities in fluid communication with the space proximate said bearing when said seal means is resiliently interposed between said leg and said cutter.

36. The earth boring bit of claim 32 wherein said seal means is provided with a plurality of cavities in fluid communication with the space proximate said bearing when said seal means is resiliently interposed between said leg and said cutter.

* * * * *

PO-1050
(5/69)

UNITED STATES PATENT OFFICE
CERTIFICATE OF CORRECTION

Patent No. 3,663,073            Dated May 16, 1972

Inventor(s) Charles L. Bronson

It is certified that error appears in the above-identified patent and that said Letters Patent are hereby corrected as shown below:

In the Abstract, penultimate line, "enchance" should be --enhance--.

Claim 10, lines 4 and 5, the word "opposes" should be --opposed--.

Claim 19, line 6, "hearing" should be --bearing--.

Signed and sealed this 7th day of November 1972.

(SEAL)
Attest:

EDWARD M. FLETCHER, JR.            ROBERT GOTTSCHALK
Attesting Officer                   Commissioner of Patents